Aug. 20, 1935.  C. STEDEFELD ET AL  2,011,918
BOGIE TRUCK
Filed Jan. 23, 1933  2 Sheets-Sheet 1

Inventors:
Curt Stedefeld
Willy Black
By Potter, Pierce & Scheffler
Attorneys.

Aug. 20, 1935. C. STEDEFELD ET AL 2,011,918
BOGIE TRUCK
Filed Jan. 23, 1933 2 Sheets-Sheet 2

Inventors:
Curt Stedefeld
Willy Black
By Potter, Pierce & Scheffler
Attorneys.

Patented Aug. 20, 1935

2,011,918

UNITED STATES PATENT OFFICE 2,011,918

BOGIE TRUCK

Curt Stedefeld and Willy Black, Hanover, Germany; said Black assignor to said Stedefeld Application January 23, 1933, Serial No. 653,203
In Germany January 30, 1932

3 Claims. (Cl. 105—171)

In high speed railway vehicles it is of importance as regards comfortable travel and preservation of the vehicle body, to reduce the transmission of lateral shocks, which become greater as the speed rises, to the vehicle body. This is done in known manner by the use of pendulum suspension or the provision of rolling bodies between the vehicle body and the trucks whereby easy relative movement between the parts is achieved. This alone does not suffice however; on the contrary the lateral movement must be made sufficiently great, but this can only be done with great difficulty in the usual truck construction with cradle suspension on vertical or nearly vertical pendulum bars, on account of limited room. The limited length of the pendulum bars, owing to the rapid rise in the restoring force, makes the shocks particularly inconveniently noticeable. The guiding of the pivot secured to the vehicle body by a block moving in the truck frame, as is usual on locomotives, permits a relatively considerable lateral movement but has the disadvantage of requiring a certain amount of maintenance and a certain amount of play in the guides. This play is particularly disadvantageous in vehicles with driving trucks because it is gradually increased by the driving and braking forces which have to be transmitted in constantly alternating directions, and gives rise to longitudinal shocks.

According to the present invention the truck is connected to the vehicle body by one or more link bars, pivotally connected at one end to the vehicle body and at the other to a transverse member pivotally mounted on the truck. The pivots are provided with large bearing surfaces and can be closely fitted so that no play is present. As compared with constructions heretofore known, one embodiment of the invention has the advantage of leaving the middle of the truck free for the mounting of special appliances such as driving motors, driving gears, air brake mechanism and the like. A further embodiment offers the advantage of low head-room requirements and an effective transmission of force, although the middle of the truck must in this case be available for the connecting members.

Figure 1:
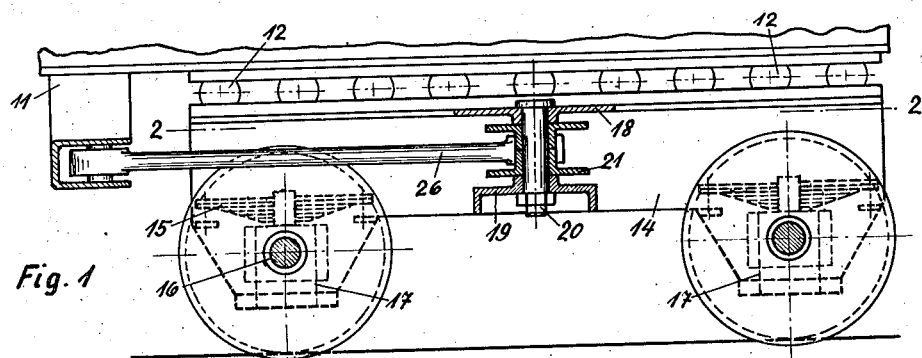
Figure 2:
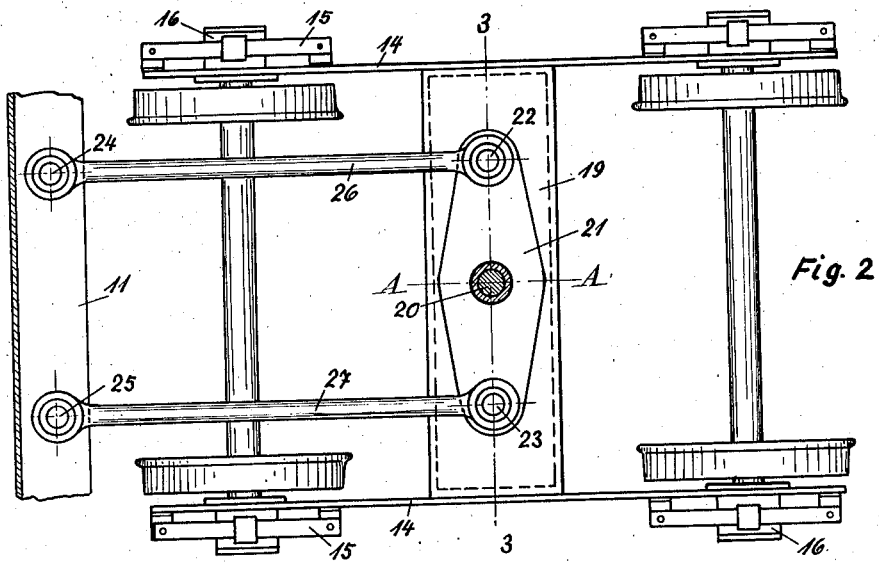
Figure 3:
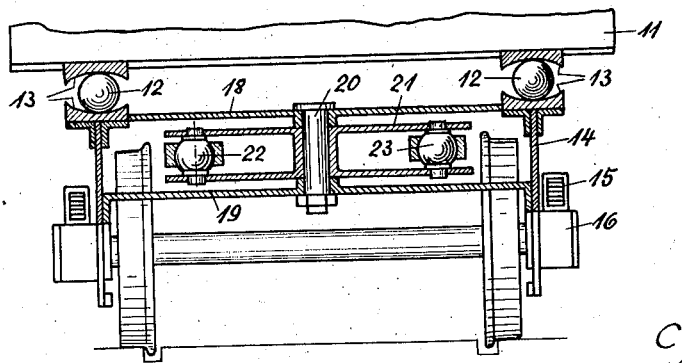
Figure 4:
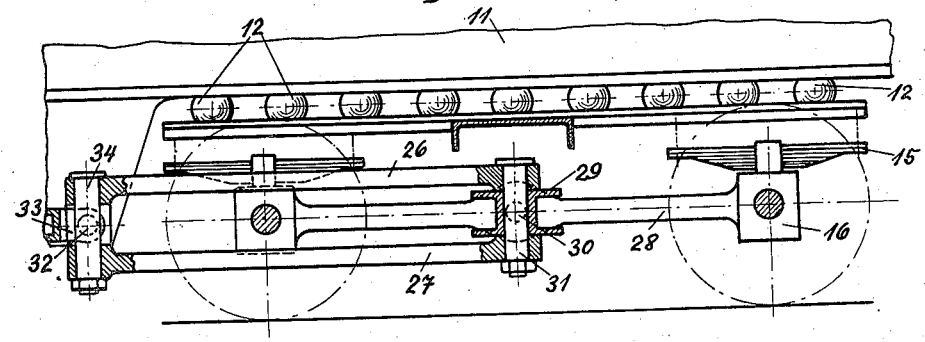
Figure 5:
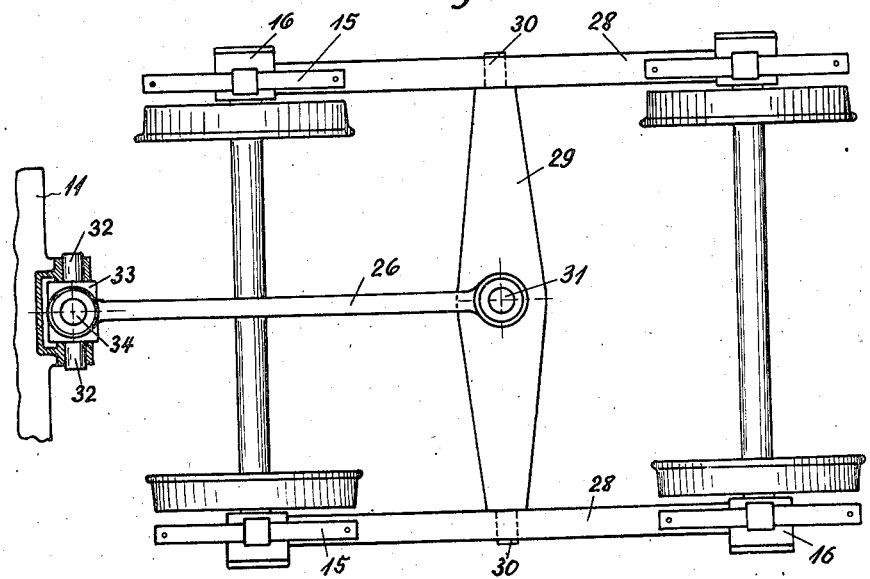

In the accompanying drawings Fig. 1 is a vertical section, Fig. 2 a section on line 2—2 of Fig. 1, and Fig. 3 a section on line 3—3 of Fig. 1 of one embodiment of the invention, and Figs. 4 and 5 are a vertical section and a plan, respectively, of a further embodiment of the invention.

In the drawings the vehicle body 11 is supported on the truck frame by rolling bodies 12 so that in addition to the large lateral movement which the new connection makes possible the truck can move easily on the vehicle body.

In Figs. 1 to 3 the axle boxes 16 are carried in cut out yokes 17 in the truck frame 14 in the known manner. The two side members of the frame 14 are connected by cross-beams 18 and 19 which carry a vertical bolt 20 at their centers. A member 21 is pivotally mounted on the bolt 20 and carries ball joints 22 and 23 at its ends. Corresponding ball joints 24 and 25 are carried by the vehicle body 11 and are connected to joints 22 and 23, respectively, by link bars 26 and 27.

It will be obvious that the movements of the truck under the vehicle body can take place freely with the described connection. Turning takes place about bolt 20 and under transverse shocks the link bars 26 and 27 pivot about joints 24 and 25. If the joints 22 and 23 are the same distance apart, which is however not absolutely essential, the rectangle 22, 23, 24, 25 forms a parallelogram on lateral motion of the truck. The ball formation of joints 22 to 25 is advantageous because the vertical relation between the vehicle body 11 and the truck 14 is not constant because of the curvature of the roller tracks 13 and the connection is thereby kept free from play in every position.

Figs. 4 and 5 show a connection between the truck and the vehicle body which is fundamentally similar to that just described. It can be imagined as arising by turning the truck connection of Figs. 1-3 90° about its longitudinal axis A—A so that the link bars 26 and 27 are positioned one above the other. The transverse member 29 in its bearings 30 forms the pivot for the bolt 31 carried by 1, while bolt 31 corresponds to pivoted member 21 of Figs. 1-3. A member 33 is mounted on the vehicle body 11 on pivots 32 and carries a vertical bolt 34. The link bars 26 and 27 are pivotally connected to the upper and lower ends, respectively, of bolts 31 and 34.

With the arrangement just described the same play-free linkage and easy movement is provided as in the previously described embodiment. If the link bars 26 and 27 are provided with ball joints at each end as in Figs. 1-3, the member 33 can be omitted and bolt 34 can be fixed to vehicle body 31.

The embodiments described by way of illustration can, of course, be applied to the connection of other types of trucks to vehicle bodies, and obviously the system of linkage of Figs. 1-3 can be applied to the truck frame construction of Figs.

4 and 5; for example, by pivotally mounting the ends of a cross member, carrying the vertical bolt, in the side members of the truck carried on the axle boxes.

We claim:

1. A vehicle body-truck connection including a member pivotally mounted on the truck and a pair of longitudinally positioned hinge bars pivotally connected at one end to the vehicle body and pivotally connected at the other end to either end of said pivotally mounted member.

2. A vehicle body-truck connection including a transverse member pivotally mounted on a crossbeam connected to the frame carried on the springs of the truck and a pair of substantially parallel longitudinally positioned hinge bars each pivotally connected at one end to the vehicle body and pivotally connected at the other end to said pivotally mounted transverse member.

3. A vehicle body-truck connection including a transverse member pivotally mounted at its center on a vertical pivot member carried by a cross beam connected to the frame carried on the springs of the truck and a pair of substantially parallel longitudinally positioned hinge bars each pivotally connected at one end to the vehicle body and pivotally connected at the other end to either end of said pivotally mounted transverse member.

CURT STEDEFELD.
WILLY BLACK.